United States Patent
Fukumasa et al.

[11] Patent Number: 6,058,138
[45] Date of Patent: May 2, 2000

[54] RADIO RECEPTION SYSTEM PROVIDING IMPROVED TRANSMISSION QUALITY

[75] Inventors: Hidenobu Fukumasa; Yasuyuki Oishi; Kazuo Nagatani; Hajime Hamada, all of Kawasaki, Japan

[73] Assignee: Fujitsu Limited, Kanagawa, Japan

[21] Appl. No.: 08/870,606

[22] Filed: Jun. 6, 1997

[30] Foreign Application Priority Data

Dec. 20, 1996 [JP] Japan ..................................... 8-341575

[51] Int. Cl.⁷ .............................. H04B 15/00; H04K 1/00; H04L 27/30
[52] U.S. Cl. ........................... 375/208; 375/200; 375/209; 375/210; 375/267; 375/346; 375/347; 375/349
[58] Field of Search ..................................... 375/349, 347, 375/346, 208, 209, 210, 260, 267, 200

[56] References Cited

U.S. PATENT DOCUMENTS

| | | | |
|---|---|---|---|
| 3,633,107 | 1/1972 | Brady | 375/267 |
| 5,224,122 | 6/1993 | Bruckert | 375/200 |
| 5,233,626 | 8/1993 | Ames | 375/200 |
| 5,325,394 | 6/1994 | Bruckert | 375/200 |
| 5,425,059 | 6/1995 | Tsujimoto . | |
| 5,553,102 | 9/1996 | Jasper et al. | 375/347 |
| 5,671,221 | 9/1997 | Yang | 370/320 |
| 5,673,286 | 9/1997 | Lomp | 375/208 |
| 5,691,974 | 11/1997 | Zehavi et al. | 370/203 |
| 5,724,378 | 3/1998 | Miki et al. | 375/200 |
| 5,818,866 | 10/1998 | Wilk | 375/200 |
| 5,881,057 | 3/1999 | Komatsu | 370/335 |
| 5,903,596 | 3/1999 | Nakano | 375/208 |

*Primary Examiner*—Stephen Chin
*Assistant Examiner*—Michael W. Maddox
*Attorney, Agent, or Firm*—Helfgott & Karas, PC.

[57] ABSTRACT

A radio receiver includes a plurality of demodulating units for demodulating a received radio wave received via a plurality of paths so as to produce respective demodulated signals, and combining units for executing a combination process of synchronizing and combining the demodulated signals produced by the plurality of demodulating units, the combining units correlating the demodulated signals produced by the plurality of demodulating units and excluding from a combination process a demodulated signal that meets a predetermined condition based on a predetermined algorithm.

10 Claims, 4 Drawing Sheets

| DELAY TIME(CHIP) | RATIO OF RECEIVED POWER |
|---|---|
| 0 | 0.33 |
| 5/4 | 0.58 |
| 211/4 | 0.06 |
| 146/4 | 0.03 |

FIG. 4B

RADIO RECEPTION SYSTEM PROVIDING IMPROVED TRANSMISSION QUALITY

BACKGROUND OF THE INVENTION

1. Field of the Invention

The present invention generally relates to radio receivers and more particularly, to a radio receiver which improves transmission quality by compensating for channel distortion in a radio wave received via a plurality of branches and paths and combining compensated signals.

2. Description of the Related Art

Recently, the number of people subscribing to a radio communication system is increasing with the advancement in the liberatization of the market. Intensive studies are being undertaken to develop code division multiple access (CDMA) characterized by a high efficiency in using radio frequencies.

In a reception system in which CDMA is introduced, a high transmission quality is obtained by dividing and despreading a received wave arriving over a time longer than a time commensurate with a reciprocal of a signal band, compensating for a channel distortion (which occurs as a result of a variation in the amplitude and a phase rotation) in individual waves thus processed, and subjecting the waves to a predetermined combination process. A RAKE receiver is most suitably used in such a system.

Figure 1:
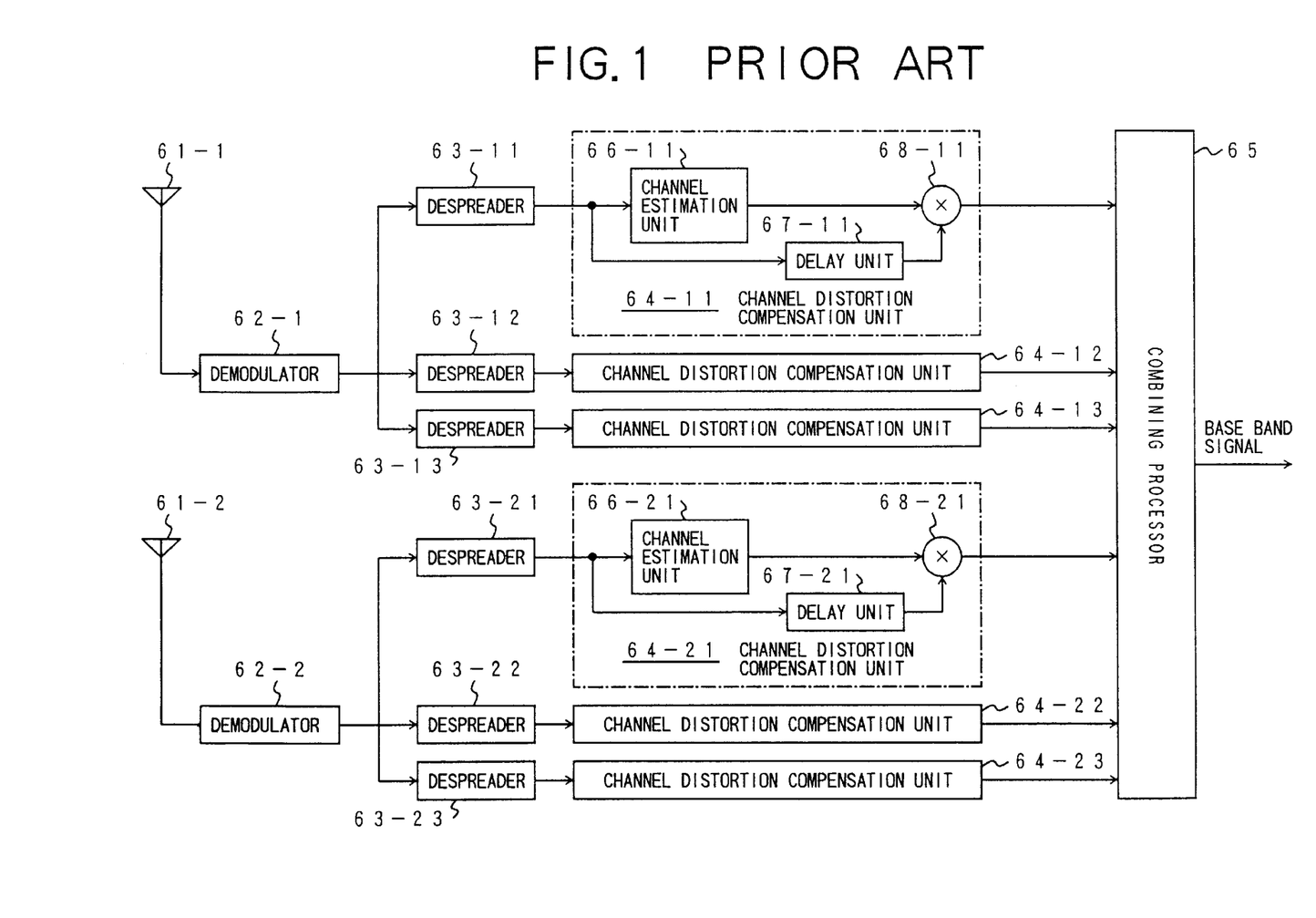
FIG. 1 shows a construction of a RAKE receiver according to the related art.

FIG. 1 shows a construction of a RAKE receiver according to the related art.

Referring to FIG. 1, a power feed end of an antenna 61-1 is connected to inputs of despreaders 63-11, 63-12, 63-13 via a demodulator 62-1. Likewise, a power feed end of an antenna 61-2 is connected to inputs of despreaders 63-21, 63-22, 63-23 via a demodulator 62-2. Outputs of the despreaders 63-11, 63-12, 63-13 are connected to corresponding inputs of a combination processor 65 via channel distortion compensation units 64-11, 64-12, 64-13. Likewise, outputs of the despreaders 63-21, 63-22, 63-23 are connected to corresponding inputs of the combination processor 65 via channel distortion compensation units 64-21, 64-22, 64-23. A base band signal subject to signal detection is obtained at an output of the combination processor 65.

The channel distortion compensator unit 64-11 is constructed of a channel estimation unit 66-11, a delay unit 67-11 and a multiplier 68-11, outputs of the channel estimation unit 66-11 and the delay unit 67-11 being connected to an input of the multiplier 68-11 and an output of the multiplier 68-11 being connected to a corresponding input of the combination processor 65.

The channel distortion compensation units 64-11, 64-12, 64-13, 64-21, 64-22, 64-23 are constructed similarly. Therefore, suffixes 12, 13, 21, 22, 23 are used to designated those components in the channel distortion compensation units 64-12, 64-13, 64-21, 64-22, 64-23, respectively, that correspond to the channel estimation unit 66-11, the delay unit 67-11 and the multiplier 68-11. The description and illustration of those components are omitted.

According to the construction shown in FIG. 1, a radio wave arriving at the antennas 61-1, 61-2 is demodulated by the demodulators 62-1, 62-2, respectively, and subject to despreading process by a group of the despreaders 63-11, 63-12, 63-13 and a group of the despreaders 63-21, 63-22, 63-23, respectively, in accordance with the same spreading code. Thus, the received radio wave is separated into individual waves corresponding to respective paths formed in a radio transmission route.

A received radio wave will hereinafter be denoted by $Y_{k,n}$, where n indicates a time series and k (which ranges between 1 and 6(=K)) indicates a number associated with one of the fingers formed by each of the despreaders 63-11, 63-12, 63-13, 63-21, 63-22, 63-23.

Each of the channel estimation units 66-11, 66-12, 66-13, 66-21, 66-22, 66-23 of the channel distortion compensation units 64-11, 64-12, 64-13, 64-21, 64-22, 64-23 respectively, retrieves a pilot signal contained in the divided received wave in a predetermined format so as to estimate a channel characteristic $g_{k,n}$ of the associated path by detecting an error of a signal point for the pilot signal.

Each of the multipliers 68-11, 68-12, 68-13, 68-21, 68-22, 68-23 carries out an arithmetic operation $$Z_{k,n} = g_{k,n}^* \cdot Y_{k,n}$$

where $g_{k,n}^*$ is a complex conjugate of the channel characteristic.

The combination processor 65 obtains a base band signal by carrying out an arithmetic operation $$Z_n = \sum_{k=1}^{K} Z_{k,n} \quad (1)$$

on the results of the arithmetic operation by the multipliers 68-11, 68-12, 68-13, 68-21, 68-22, 68-23.

Since the channel distortion compensation is applied to individual paths, the base band signal $Z_n$ is given as a result of a maximum ratio combination of received signal dividends weighted in accordance with a S/N ratio. Such a base band signal has a maximum S/N and is fit for signal detection.

A description will now be given of a problem with the reception according to the related art.

Referring to FIG. 1, even when the spreading codes used by the despreaders 63-11, 63-12, 63-13, 63-21, 63-22, 63-23 in the despreading process are perfectly synchronized with the received wave, the channel characteristic $g_{k,n}$ of a lower power component in the received wave arriving on a path characterized by a significantly large propagation loss is estimated by the channel estimation units 66-11, 66-12, 66-13, 66-21, 66-22, 66-23 with a significantly low precision.

In a mobile communication system, the channel characteristic varies constantly as a mobile station moves between areas of different geographical conditions and different distributions of buildings, trees etc. It is also to be noted that a variety of multipaths are created in the mobile communication system. Therefore, the aforementioned low power component could occur relatively frequently.

It is thus likely that a noise is superimposed on the base band signal obtained at the output of the combination processor 65 due to an error in the estimation process. When the noise is superimposed, the precision of the subsequent signal detection is also lowered, thus causing the quality of communication to be degraded significantly.

SUMMARY OF THE INVENTION

Accordingly, a general object of the present invention is to provide a radio receiver in which the aforementioned problems are eliminated.

Another and more specific object of the present invention is to provide a radio receiver adapted for transmission routes occurring in a variety of transmission schemes and capable of ensuring a high precision in signal detection without requiring a significant modification in a reception system.

Figure 2:
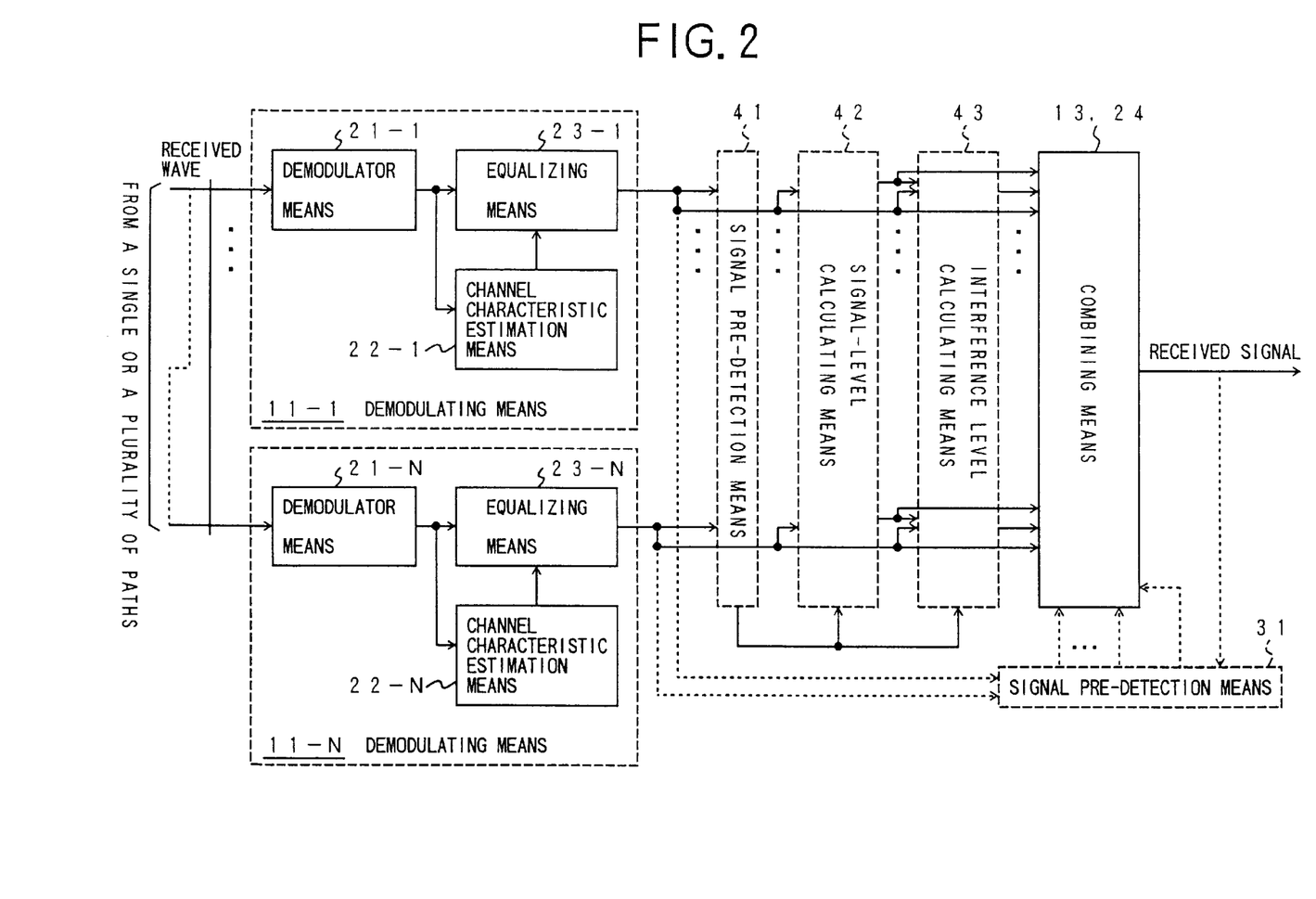
FIG. 2 shows an operating principle of the present invention.

An overview of the present invention will now be presented with reference to FIG. 2.

FIG. 2 shows an operating principle of the present invention.

Referring to FIG. 2, a radio receiver according to the present invention includes a plurality of demodulating means 11-1~11-N for demodulating a received radio wave received via a plurality of paths so as to produce respective demodulated signals; and combining means 13 for executing a combination process of synchronizing and combining the demodulated signals produced by the plurality of demodulating means 11-1~11-N. The combining means 13 correlates the demodulated signals produced by the plurality of demodulating means 11-1~11-N and excludes from a combination process a demodulated signal that meets a predetermined condition based on a predetermined algorithm.

Such an algorithm ensures that the demodulated signal associated with a path characterized by a large propagation loss and a large propagation delay is excluded from the combination process. Thus, the path that would provide a noise due to its large propagation loss and a large propagation delay is excluded from the combination process and the transmission quality is prevented from being degraded.

The received radio wave could be modulated using a pilot signal including a known symbol, and the combining means could exclude a demodulated signal from the combination process depending on whether an SN ratio is below a predetermined threshold value, the SN ratio corresponding to a ratio between a signal position indicating the known symbol and an error of the demodulated signal position with respect the pilot signal position in a signal space.

According to this aspect of the present invention, only the demodulated signal that has a desired correlation between a level or a phase and an S/N ratio is subject to the combination process. Therefore, the maximum ratio combination is approximately possible.

Referring to FIG. 2, the aforementioned objects of the present invention can also be achieved by a radio receiver comprising: a plurality of demodulator means 21-1~21-N for demodulating in parallel a received radio wave modulated using a pilot signal of a predetermined format and arriving via a respective one of a plurality of branches, so as to obtain a plurality of demodulated signals corresponding to the plurality of branches; a plurality of channel characteristic estimation means 22-1~22-N for retrieving, from the plurality of demodulated signals obtained by the plurality of demodulator means 21-1~21-N, the pilot signal for individual paths formed by the plurality of branches, in accordance with the predetermined format, and for estimating a channel characteristic based on an error of a pilot signal position; a plurality of equalizing means 23-1~23-N for applying an equalization process, adapted for the channel characteristic determined by the plurality of channel characteristic estimation means 22-1~22-N, on the plurality of demodulated signals obtained by the plurality of demodulator means 21-1~21-N, so as to obtain equalized demodulated signals corresponding to the plurality of branches; and combining means 24 for executing a combination process of combining the equalized demodulated signals obtained by the plurality of equalizing means 23-1~23-N so as to produce a received signal.

The combining means could cross-correlate the equalized modulated signals obtained by the plurality of equalizing means and exclude from the combination process the equalized demodulated signal when a cross-correlation value of the equalized demodulated signal rated against one of a maximum cross-correlation value, a cumulative cross-correlation value and an average cross-correlation value is below a predetermined threshold value.

The demodulated signal associated with a path characterized by a large propagation loss and a large propagation delay is removed from the combination process. A degradation in the transmission quality that occurs in the receiver of the related art due to a degradation in the channel characteristic estimated by the channel characteristic estimation means 22-1~22-N is prevented.

The radio receiver could further comprise signal pre-detection means for applying a first signal detection process on the equalized demodulated signal obtained by the plurality of equalizing means so as to obtain a plurality of non-combined detection results, and for obtaining a combined detection result by applying a second signal detection process on the received signal produced by the combining means; wherein the combining means receives the plurality of non-combined detection results and the combined detection result obtained by the signal pre-detection means, correlates each of the plurality of non-combined detection results with the combined detection result, and excludes from the combination process the equalized demodulated signal when a cross-correlation value of the equalized demodulated signal rated against one of a maximum cross-correlation value, a cumulative cross-correlation value and an average cross-correlation value is below a predetermined threshold value.

According to this aspect of the present invention, the equalized demodulated signal associated with a path characterized by a large propagation loss and a large propagation delay is determined with reference to the combined detection result and is excluded from the combination process. Therefore, degradation in the transmission quality of the combined signal that occurs in the receiver of the related art is properly prevented.

The radio receiver could further comprise signal pre-detection means for obtaining a plurality of non-combined constant-amplitude signals by applying a limiter function process on the equalized demodulated signals obtained by the plurality of equalizing means, and for obtaining a combined constant-amplitude signal by applying a limiter function process on the received signal produced by the combining means; wherein the combining means receives the plurality of non-combined constant-amplitude signals and the combined constant-amplitude signal obtained by the signal pre-detection means, correlates a phase component of each of the plurality of non-combined constant-amplitude signals with a phase component of the combined constant-amplitude signal, and excludes from the combination process the equalized demodulated signal when a cross-correlation value of the equalized demodulated signal rated against one of a maximum cross-correlation value, a cumulative cross-correlation value and an average cross-correlation value is below a predetermined threshold value.

According to this aspect of the present invention, operations for determining a cross-correlation are performed only on the phase component of the non-combined constant-amplitude signal and the combined constant-amplitude signal. Therefore, the operations are simplified and the equalized demodulated signal associated with a path characterized by a large propagation delay is properly excluded from the combination process.

The combining means could cross-correlate the equalized modulated signals obtained by the plurality of equalizing means, determine an autocorrelation value of each of the equalized modulated signals, and exclude from the combination process the equalized demodulated signal when a cross-correlation value and an autocorrelation value of the equalized demodulated signal rated against one of a maximum cross-correlation value, a cumulative cross-correlation value and an average cross-correlation value are below a predetermined threshold value.

According to this aspect of the present invention, the equalized demodulated signal to be excluded from the combination process is determined without omitting the process for calculating the autocorrelation. That is, repetition of similar operations ensures that the necessary determination is made. Hence, the efficiency of the operations is improved.

The combining means could determine an autocorrelation value of each of the equalized modulated signals and exclude from the combination process the equalized demodulated signal when a cross-correlation value and an autocorrelation value of the equalized demodulated signal rated against one of a maximum cross-correlation value, a cumulative cross-correlation value and an average cross-correlation value is below a predetermined threshold value.

According to this aspect of the present invention, the equalized demodulated signal to be excluded from the combination process is determined without omitting the process for calculating the autocorrelation. That is, repetition of similar operations ensures that the necessary determination is made. Hence, the efficiency of the operations is improved.

The combining means could determines a level of each of the equalized modulated signals obtained by the plurality of equalizing means and exclude from the combination process the equalized demodulated signal when the level of the equalized demodulated signal rated against one of a maximum level, a cumulative level and an average level is below a predetermined threshold value.

According to this aspect of the present invention, it is possible to determine the equalized demodulated signal to be excluded from the combination by a simple procedure involving calculations of sums of squares or sums of squares of absolute values. Therefore, the operations are simplified and the equalized demodulated signal associated with a path characterized by a large propagation delay is properly excluded from the combination process.

The combining means could exclude from the combination process the equalized demodulated signal when one of a first average value and a second average value rated against one of a maximum value of one of the first and second average values, a cumulative value of one of the first and second average values and an average value of one of the first and second average values is below a predetermined threshold value. Here, the first average value is an average value of instantaneous values of the equalized demodulated signals, and the second average value is an average value of absolute values of the instantaneous values.

According to this aspect of the present invention, it is possible to determine the equalized demodulated signal to be excluded from the combination process by a simple procedure in which the operation necessary to calculate the sum of the squares is omitted. Therefore, the operations are simplified.

The combining means could determine a correlation value including an autocorrelation value for all combinations of the equalized demodulated signals and obtain a cross-correlation value by subtracting the autocorrelation value from the correlation value.

According to this aspect of the present invention, the efficiency of the operations is improved.

The radio receiver may further comprise: signal pre-detection means for performing a signal detection on a sum of the equalized demodulated signals obtained by the plurality of equalizing means, so as to obtain a signal point indicated by the sum; signal level calculating means for normalizing each of the equalized demodulated signals obtained by the plurality of equalizing means with respect to a signal point obtained by the signal pre-detection means, so as to obtain a level of a signal component; interference level calculating means for calculating a difference between a level of each of the equalized demodulated signals and the level obtained by the signal level calculating means, so as to obtain a level of an interference component; wherein the combining means performs the combination process by multiplying each of the equalized demodulated signals by a weight equal to a ratio between the level of the signal component determined by the signal level calculating means and the level of the interference determined by the interference level calculating means.

According to this aspect of the present invention, it is possible to perform the maximum ratio combination with an improved precision since the equalized demodulated signal associated with a path characterized by a large propagation loss and a large propagation delay is included in the combination process by being given a weight corresponding to a S/N ratio.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 3:
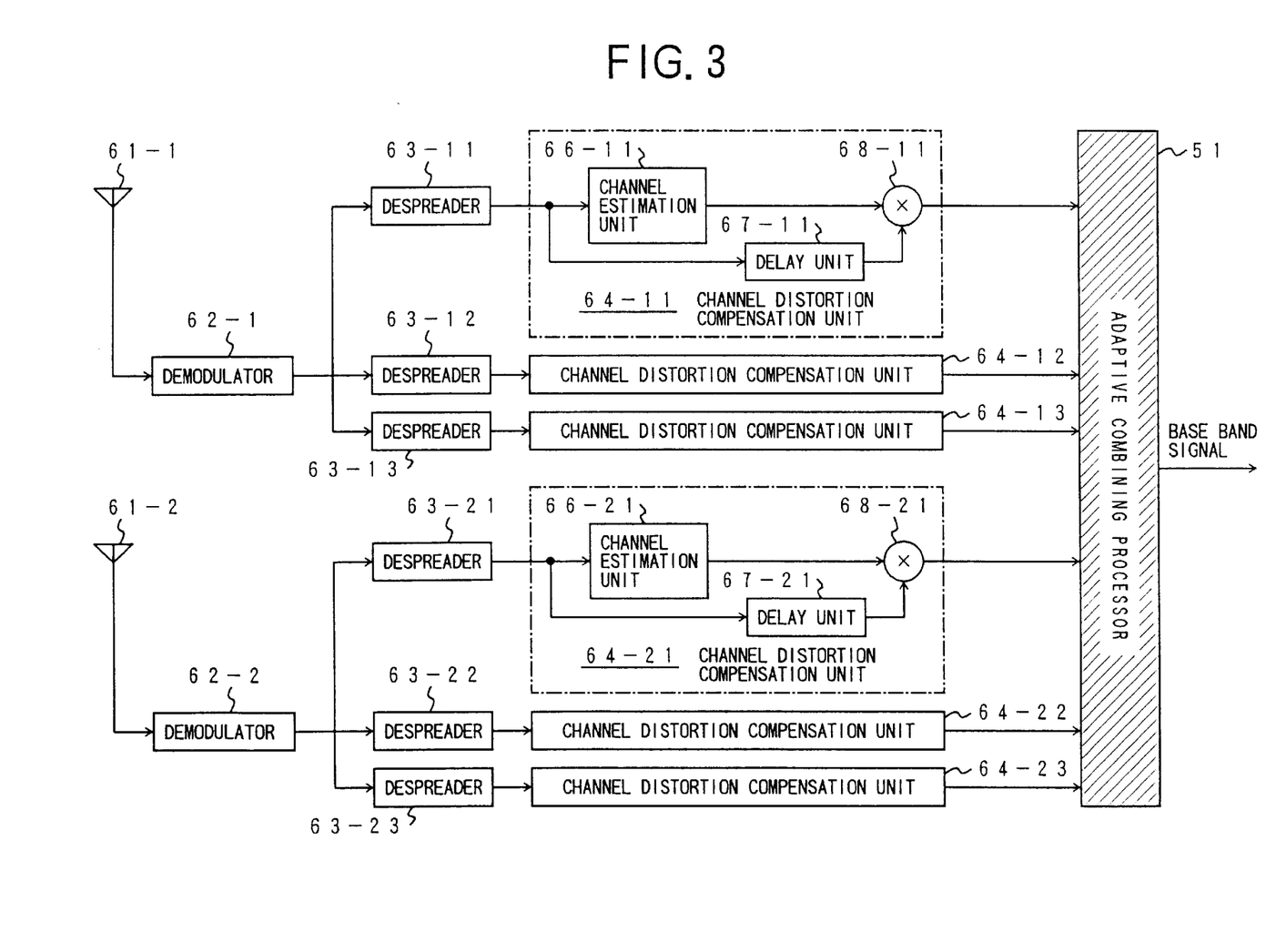
FIG. 3 shows a radio receiver according to an embodiment of the present invention.

FIG. 3 shows a radio receiver according to an embodiment of the present invention.

Those components that correspond to the components of FIG. 1 are designated by the same reference numerals and the description thereof is omitted.

The radio receiver of FIG. 3 differs from that of the related art in that an adaptive combination processor 51 is provided in place of the combination processor 65.

The demodulator 62-1 and the despreaders 63-11, 63-12, 63-13 correspond to the demodulator means 21-1, the demodulator 62-2 and the despreaders 63-21, 63-22, 63-23 correspond to the demodulator means 21-2, etc. The channel estimation units 66-11, 66-12, 66-13 correspond to the channel characteristic estimation means 22-1, and the channel estimation units 66-21, 66-22, 66-23 correspond to the channel characteristic estimation means 22-2, etc. The delay units 67-11, 67-12, 67-13 and the multipliers 68-11, 68-12, 68-13 correspond to the equalizing means 23-1, the delay units 67-21, 67-22, 67-23 and the multipliers 68-21, 68-22, 68-23 correspond to the equalizing means 23-2, etc. The adaptive combination processor 51 corresponds to the combining means 13, 24.

A description will now be given of a first mode of operation of the radio receiver according to the embodiment of the present invention.

The antennas 61-1, 61-2, the demodulators 62-1, 62-2, the despreaders 63-11, 63-12, 63-13, 63-21, 63-22, 63-23 and the channel distortion compensation units 64-11, 64-12, 64-13, 64-21, 64-22, 64-23 operate in the same manner as in the radio receiver of FIG. 1, so that the description of the operation of these components is omitted.

The results $Z_{k,n}$ of the operation by the multipliers 68-11, 68-12, 68-13, 68-21, 68-22, 68-23 included in the channel distortion compensation units 64-11, 64-12, 64-13, 64-21, 64-22, 64-23, respectively, are fed parallel to the adaptive combination processor 51. The adaptive combination processor 51 carries out an arithmetic operation $$\Theta_k = \left| \sum_{n=1}^{N} Z_{k,n} \cdot \left[ \sum_{i=1,i\neq k}^{K} Z_{i,n} \right] * \right| \quad (2)$$

in order to determine a cross-correlation $\Theta_k$, where i is a number indicating one of the finger numbers k ranging from 1 to 6(=K), and N is a block length of transmitted information. In this way, the multiplication results provided by the multipliers 68-11, 68-12, 68-13, 68-21, 68-22, 68-23 are cross-correlated.

The adaptive combination processor 51 determines a maximum value max($\Theta_i$) of the cross correlation results $e_{\Theta 1}-\Theta_K$. The adaptive combination processor 51 determines a coefficient $\Omega_k$ which is at "1" when the ratio of the correlation result with respect to the maximum value is equal to or greater than a threshold value $\Theta_{th}$ (for example, 0.1), and which is at "0" when the ratio is below the threshold value. The coefficients $\Omega_k$ corresponding for all the fingers k ranging from 1 to K are determined.

The adaptive combination processor 51 performs a combination process by carrying out an arithmetic operation $$Z_n = \sum_{k=1}^{K} \Omega_k \cdot Z_{k,n} \quad (3)$$

instead of the arithmetic operation of (1) performed in the related art.

In such a combination process, the cross correlation result $\Theta_k$ shown in the equation (2) indicates the accuracy (reliability) of the multiplication result associated with the finger k ranging from 1 to K. If the reliability is lower than the threshold value $\Theta_{th}$, the coefficient $\Omega_k$ is at "0" so that the associated correlation result is excluded from the combination process.

Thus, according to the embodiment of the present invention, the output of the finger that would cause a noise in the receiver of the related art superimposed on the base band signal is not subject to the combination process. Hence, the transmission quality is improved.

Figure 4A:
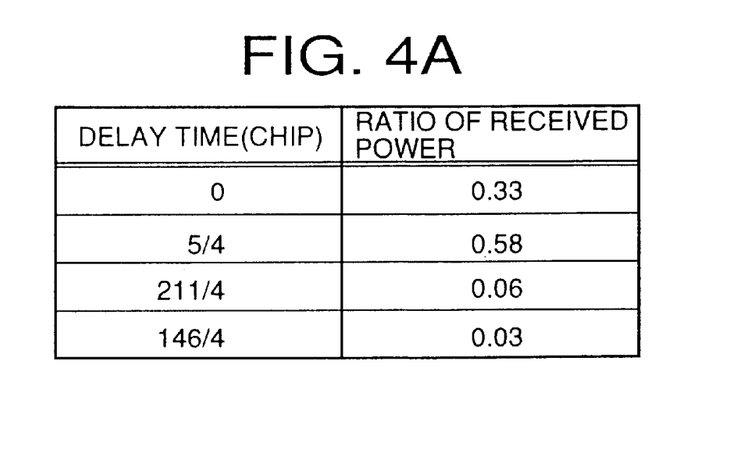
FIG. 4A is a table listing received waves via respective paths.
Figure 4B:
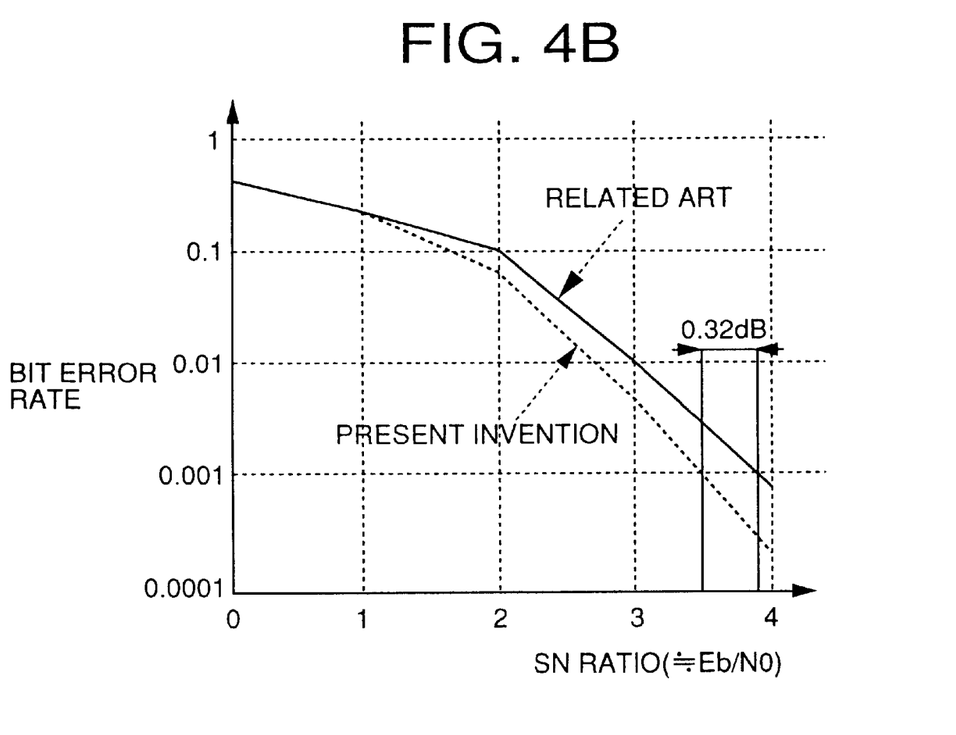
FIG. 4B shows how the transmission quality is improved according to the present invention.

As shown in FIG. 4B, an improvement of 0.32 dB in the transmission quality results at a bit error rate of $10^{-3}$, assuming a CDMA communication system wherein a rate 1/3 convolution encoder is employed, a direct sequence spread spectrum system with a spreading ratio of 64 is employed, four paths shown in FIG. 4A exist in the communication line, and a total of eight fingers are provided via two antennas.

Such an improvement in the transmission quality means that it is possible to reduce the transmitting power of a transmitter (for example, a terminal accessing a mobile communication system) by 0.32 dB. Assuming the number of terminals remain unchanged, the interference is reduced by about 7.1% such that $$10^{-0.32/10} = 0.929 = 1/1.076$$

If the number of subscribers is increased at a rate lower than 7.6%, the interference could be maintained lower than 7.6%.

A description will now be given of a second mode of operation of the radio receiver according to the embodiment of the present invention.

A difference between the first and second modes of operation is that different procedures are used to perform the arithmetic operation for calculating the correlation.

According to the second mode of operation, the results $Z_{k,n}$ of the arithmetic operation by the multipliers 68-11, 68-12, 68-13, 68-21, 68-22, 68-23 are fed parallel to the adaptive combination processor 51. The adaptive combination processor 51 obtains signal detection results (hereinafter, referred to as individual detection results) $f(Z_{k,n})$ by carrying out signal detection on these results $Z_{k,n}$.

Further, the adaptive combination processor 51 obtains a signal detection result (hereinafter, referred to as a combined detection result) given by $$f\left( \sum_{i=1}^{K} Z_{i,n} \right)$$

by summing the multiplication results individually obtained for each of the finger numbers i ranging from 1 to 6(=K).

The adaptive combination processor 51 cross-correlates the individual detection results with the combined detection result by performing an arithmetic operation $$\Theta_k = \sum_{n=1}^{N} f(Z_{k,n}) f\left( \sum_{i=1,i\neq k}^{K} Z_{i,n} \right) \quad (4)$$

Similarly to the first mode of operation, the adaptive combination processor 51 determines a coefficient $\Omega_k$ for each of the fingers ranging from 1 to K, based on the correlation results $\Theta_1-\Theta_K$, and executes a combination process by carrying out the arithmetic operation shown in the equation (3).

The correlation results $\Theta_1-\Theta_K$ are calculated by the operation on the values given as results (the individual detection results and the combined detection result) of the signal detection. Therefore, the correlation can be determined with better precision and efficiency as when the equation of (2) is employed.

Accordingly, the second mode of operation provides an improved response and a stable high transmission quality.

A description will now be given, with reference to FIG. 3, of a third mode of operation.

A difference between the first mode of operation and the third mode of operation is that different procedures are used to perform the arithmetic operation for calculating the correlation.

According to the third operation, the results $Z_{k,n}$ of the arithmetic operation by the multipliers 68-11, 68-12, 68-13, 68-21, 68-22, 68-23 are fed parallel to the adaptive combination processor 51. A phase component (hereinafter, referred to as an individual phase component) $g(Z_{k,n})$ is obtained by carrying out an arithmetic operation $$g(Z_{k,n}) = \frac{Z_{k,n}}{|Z_{k,n}|}$$

for the individual finger numbers k ranging from 1 to 6(=K).

Further, the adaptive combination processor 51 carries out a similar arithmetic operation on multiplication results $Z_{k,n}$ obtained on individual finger numbers k ranging from 1 to 6(=K) so as to obtain the signal detection result (hereinafter, referred to as a combined phase component) given by $$g\left(\sum_{i=1}^{K} Z_{i,n}\right)$$

The adaptive combination processor 51 cross-correlates the individual phase components with the combined phase component by performing an arithmetic operation $$\Theta_k = \left| \sum_{n=1}^{N} g(Z_{k,n}) g\left(\sum_{i=1, i \neq k}^{K} Z_{i,n}\right) * \right| \quad (5)$$

instead of the operation shown in the equation (2).

Further, the adaptive combination processor 51 determines a coefficient $\Omega_k$ for each of the fingers ranging from 1 to K, based on the correlation results $\Theta_1$–$\Theta_K$, and executes a combination process by carrying out the arithmetic operation shown in the equation (3).

The correlation results $\Theta_1$–$\Theta_K$ are calculated by the operation on the values of the individual phase components and the combined phase component which do not include an amplitude component. Therefore, the correlation can be determined with better precision and efficiency as when the equation of (2) is employed.

Accordingly, the third mode of operation provides an improved response and a stable high transmission quality.

A description will now be given, with reference to FIG. 3, of a fourth mode of operation.

A difference between the first mode of operation and the fourth mode of operation is that different procedures are used to perform the arithmetic operation for calculating the correlation.

According to the fourth mode of operation, the cross-correlation results (including the autocorrelation) $\Theta_1$–$\Theta_n$ are obtained by carrying out an arithmetic operation given by $$\Theta_k = \left| \sum_{n=1}^{N} Z_{k,n} \cdot \left[\sum_{i=1}^{K} Z_{i,n}\right] * \right| \quad (6)$$

In this arithmetic operation, the autocorrelation values and the cross-correlation values for the multiplication results $Z_{k,n}$ for each of the finger numbers ranging from 1 to K are calculated. Since the autocorrelation values do not indicate fingers that should be excluded from the combination process, the procedure of the arithmetic operation is significantly simplified.

The sums $\Theta_1$–$\Theta_n$ of the autocorrelation values and the cross-correlation values may be obtained using the equation $$\Theta_k = \sum_{n=1}^{N} f(Z_{k,n}) f\left(\sum_{i=1}^{K} Z_{i,n}\right)$$

instead of the equation (4).

Alternatively, the sums $\Theta_1$–$\Theta_n$ may be obtained using the equation $$\Theta_k = \left| \sum_{n=1}^{N} g(Z_{k,n}) g\left(\sum_{i=1}^{K} Z_{i,n}\right) * \right|$$

instead of the equation (5).

The sums $\Theta_1$–$\Theta_n$ may be obtained using the equation $$\Theta_k = \left| \sum_{n=1}^{N} Z_{k,n} \cdot \left[\sum_{i=1}^{K} Z_{i,n}\right] * - \sum_{n=1}^{N} |Z_{k,n}|^2 \right|$$

instead of the equation (2). In this way, the sums of the autocorrelation values and the cross-correlation values are obtained, whereupon the autocorrelation value is subtracted therefrom. According to this procedure, the arithmetic operation is significantly simplified without sacrificing the precision of the operation.

A description will now be given, with reference to FIG. 3, of a fifth mode of operation according to the present invention.

A difference between the first mode of operation and the fifth mode of operation is that different procedures are used to perform the arithmetic operation for calculating the correlation.

According to the fifth mode of operation, the results $Z_{k,n}$ of the arithmetic operation by the multipliers 68-11, 68-12, 68-13, 68-21, 68-22, 68-23 are fed parallel to the adaptive combination processor 51. The adaptive combination processor 51 then carries out the arithmetic operation given by $$\Theta_k = \sum_{n=1}^{N} |Z_{k,n}|^2 \quad (7)$$

The values $\Theta_1$–$\Theta_K$ obtained as a result of the above arithmetic operation are equal to an average power of the multiplication results $Z_{k,n}$ obtained using the individual fingers. Therefore, the values $\Theta_1$–$\Theta_K$ varies monotonously in correspondence with the level of the noise superimposed on the multiplication results.

That is, like the values $\Theta_1$–$\Theta_K$ obtained in the first through fourth modes of operation, the values $\Theta_1$–$\Theta_K$ obtained in the fifth mode of operation may be regarded to indicate the reliability of the multiplication results $Z_{k,n}$ obtained for the individual fingers.

Therefore, according to the fifth mode of operation, the target of combination process is selected with a high precision and the transmission quality is improved, based on a simple arithmetic operation of summing the squares of the absolute values as shown in the equation (7).

While it is assumed in the fifth embodiment that the average power of the multiplication results $Z_{k,n}$ for the individual fingers is determined by calculating the sum of the squares of the absolute values, an approximate arithmetic operation $$\Theta_k = \sum_{n=1}^{N} |Z_{k,n}|$$

may be carried out instead of the equation (7). In this way, the number of multiplications is significantly reduced.

A description will now be given of a sixth mode of operation of the present invention. A difference between the first mode of operation and the sixth mode of operation is that different procedures are used to perform the arithmetic operation for calculating the correlation. In the following description, it is assumed that BPSK is employed as a modulation technique.

According to the sixth mode of operation, the results $Z_{k,n}$ of the arithmetic operation by the multipliers 68-11, 68-12, 68-13, 68-21, 68-22, 68-23 are fed parallel to the adaptive combination processor 51. The adaptive combination processor 51 combines the multiplication results in time series for signal detection. In this way, the signal detection result $d_n$ ("1" or "−1") is obtained.

The adaptive combination processor 51 carries out arithmetic operations $$S_k = \left| \frac{1}{N} \cdot \sum_{n=1}^{N} Z_{k,n} / d_n \right|^2$$

$$I_k = \frac{1}{N} \sum_{n=1}^{N} |Z_{k,n}|^2 - S_k$$

so as to determine the power $S_k$ of a signal component (hereinafter, referred to as a signal component power) and the power $I_k$ of an interference component (hereinafter, referred to as an interference component power).

The adaptive combination processor 51 executes a combination process by carrying out an arithmetic operation $$Z_n = \sum_{k=1}^{K} Z_{k,n} * \cdot \frac{\sqrt{S_k}}{I_k}$$

According to the arrangement described above, the combination process is executed based on the weighting of the values corresponding to the ratio between the signal component power and the interference component power. No selection is made as to which result is to be included in the combination process. For example, the same level of improvement in the transmission quality as that provided by the maximum ratio combination is performed is obtained even if gains differ from branch to branch as when AGC is applied.

While it is assumed that the BPSK modulation technique is applied in the second and sixth operations described above, the present invention may equally be applied to other modulation techniques and signal placements.

In the embodiment of FIG. 3 described above, three fingers are formed of the despreaders 63-11, 63-12, 63-13 in a branch formed of the antenna 61-1. Likewise, three fingers are formed of the despreaders 63-21, 63-22, 63-23 in a branch formed of the antenna 61-2. However, only one finger may be formed in each of the branches. Moreover, only one branch or more than three branches may be provided.

While the construction of the adaptive combination processor 51 is not illustrated, the adaptive combination processor 51 may be formed of a single DSP as long as it is capable of processing the operations described above with a desired precision. Alternatively, the adaptive combination processor 51 may be formed of dedicated hardware.

While it is assumed in the foregoing description that the present invention is applied to the direct sequence spread spectrum CDMA communication system, the present invention may also be applied to any multiple access system.

While no specific description is given in the above of the transmission scheme and the format of a pilot signal which the channel estimation units 66-11, 66-12, 66-13, 66-21, 66-22, 66-23 use for estimation of a channel, many known techniques for channel estimation are available. It is also to be noted that the present invention could be applied to any transmission scheme and format of the pilot signal given that the precision of estimation is degraded due to a weakness of a received signal divided into respective paths.

While it is assumed that the threshold value is a constant in the embodiment described above, the threshold value may be modified depending on the radio channel setting control sequence or the condition of the radio transmission route.

While the combination process in the second through sixth modes of operation is substantially identical to the maximum ratio combination, other combination schemes could also be employed. For example, in-band combination, minimum in-band dispersion combination or other combination schemes may be employed if it is required to maximize the level or obtain the best band characteristic so as to adapt for the transmission scheme (the modulation scheme employed) applied to the radio transmission.

While it is assumed that the threshold value is fixed in the embodiment described above, the threshold value may be varied so as to adapt for the sequence of the radio channel setting control or the condition of the radio transmission route.

What is claimed is:

1. A radio receiver comprising:
   a plurality of demodulating means for demodulating a received radio wave received via a plurality of paths so as to produce respective demodulated signals; and
   combining means for executing a combination process of synchronizing and combining the demodulated signals produced by said plurality of demodulating means; wherein
   said combining means correlates each demodulated signal with the demodulating signals produced by the plurality of demodulating means and excludes from the combination process a demodulated signal that meets a predetermined condition based on a predetermined algorithm.

2. The radio receiver as claimed in claim 1, wherein the received radio wave is modulated using a pilot signal including a known symbol, and said combining means excludes a demodulated signal from the combination process depending on whether a SN ratio is below a predetermined threshold value, the SN ratio corresponding to a ratio between a signal position indicating the known symbol and an error of the demodulated signal position with respect the pilot signal position in a signal space.

3. A radio receiver comprising:
   a plurality of demodulating means for demodulating in parallel a received radio wave modulated using a pilot signal of a predetermined format and arriving via a respective one of a plurality of branches, so as to obtain a plurality of demodulated signals corresponding to the plurality of branches;
   a plurality of channel characteristic estimation means for retrieving, from the plurality of demodulated signals obtained by the plurality of demodulating means, the pilot signal for individual paths formed by the plurality of branches, in accordance with the predetermined format, and for estimating a channel characteristic based on an error of a pilot signal point;

a plurality of equalizing means for applying an equalization process, adapted for the channel characteristic determined by said plurality of channel characteristic estimation means, on the plurality of demodulated signals obtained by said plurality of demodulating means, so as to obtain equalized demodulated signals corresponding to the plurality of branches; and combining means for executing a combination process of combining the equalized demodulated signals obtained by said plurality of equalizing means so as to produce a received signal, wherein said combining means correlates each equalized demodulated signal with others obtained by said plurality of equalizing means and excludes an equalized demodulated signal whose correlation value rated against one of a maximum correlation value, a cumulative correlation value and an average correlation value is bellow a predetermined threshold value.

4. A radio receiver comprising:

a plurality of demodulating means for demodulating in parallel a received radio wave modulated using a pilot signal of a predetermined format and arriving via a respective one of a plurality of branches, so as to obtain a plurality of demodulated signals corresponding to the plurality of branches;

a plurality of channel characteristic estimation means for retrieving, from the plurality of demodulated signals obtained by the plurality of demodulating means, the pilot signal for individual paths formed by the plurality of branches, in accordance with the predetermined format, and for estimating a channel characteristic based on an error of a pilot signal point;

a plurality of equalizing means for applying an equalization process, adapted for the channel characteristic determined by said plurality of channel characteristic estimation means, on the plurality of demodulated signals obtained by said plurality of demodulating means, so as to obtain equalized demodulated signals corresponding to the plurality of branches;

combining means for executing a combination process of combining the equalized demodulated signals obtained by said plurality of equalizing means so as to produce a received signal; and signal pre-detection means for applying a first signal detection process on the equalized demodulated signal obtained by the plurality of equalizing means so as to obtain a plurality of non-combined detection results, and for obtaining a combined detection result by applying a second signal detection process on the received signal produced by said combining means; wherein said combining means receives the plurality of non-combined detection results and the combined detection result obtained by the signal pre-detection means, correlates each of the plurality of non-combined detection results with the combined detection result, and excludes from the combination process the equalized demodulated signal when a cross-correlation value of the equalized demodulated signal rated against one of a maximum cross-correlation value, a cumulative cross-correlation value and an average cross-correlation value is below a predetermined threshold value.

5. A radio receiver comprising:

a plurality of demodulating means for demodulating in parallel a received radio wave modulated using a pilot signal of a predetermined format and arriving via a respective one of a plurality of branches, so as to obtain a plurality of demodulated signals corresponding to the plurality of branches;

a plurality of channel characteristic estimation means for retrieving, from the plurality of demodulated signals obtained by the plurality of demodulating means, the pilot signal for individual paths formed by the plurality of branches, in accordance with the predetermined format, and for estimating a channel characteristic based on an error of a pilot signal point;

a plurality of equalizing means for applying an equalization process, adapted for the channel characteristic determined by said plurality of channel characteristic estimation means, on the plurality of demodulated signals obtained by said plurality of demodulating means, so as to obtain equalized demodulated signals corresponding to the plurality of branches;

combining means for executing a combination process of combining the equalized demodulated signals obtained by said plurality of equalizing means so as to produce a received signal; and signal pre-detection means for obtaining a plurality of non-combined constant-amplitude signals by applying a limiter function process on the equalized demodulated signals obtained by said plurality of equalizing means, and for obtaining a combined constant-amplitude signal by applying a limiter function process on the received signals produced by the combining means, wherein:

said combining means receives the plurality of non-combined constant-amplitude signals and the combined constant-amplitude signal obtained by the signal pre-detection means, correlates a phase component of each of the plurality of non-combined constant-amplitude signals with a phase component of the combined constant-amplitude signal, and excludes from the combination process the equalized demodulated signal when a cross-correlation value of the equalized demodulated signal rated against one of a maximum cross-correlation value, a cumulative cross-correlation value and an average cross-correlation value is below a predetermined threshold value.

6. A radio receiver comprising:

a plurality of demodulating means for demodulating in parallel a received radio wave modulated using a pilot signal of a predetermined format and arriving via a respective one of a plurality of branches, so as to obtain a plurality of demodulated signals corresponding to the plurality of branches;

a plurality of channel characteristic estimation means for retrieving, from the plurality of demodulated signals obtained by the plurality of demodulating means, the pilot signal for individual paths formed by the plurality of branches, in accordance with the predetermined format, and for estimating a channel characteristic based on an error of a pilot signal point;

a plurality of equalizing means for applying an equalization process, adapted for the channel characteristic determined by said plurality of channel characteristic estimation means, on the plurality of demodulated signals obtained by said plurality of demodulating means, so as to obtain equalized demodulated signals corresponding to the plurality of branches; and combining means for executing a combination process of combining the equalized demodulated signals obtained by said plurality of equalizing means so as to produce a received signal, wherein said combining means cross-correlates the equalized modulated signals obtained by said plurality of equalizing means and excludes from the combination process the equalized demodulated signal when a cross-correlation value of the equalized demodulated signal rated against one of a maximum cross-correlation value, a cumulative cross-correlation value and an average cross-correlation value is below a predetermined threshold value, and wherein said combining means cross-correlates the equalized modulated signals obtained by said plurality of equalizing means, determines an autocorrelation value of each of the equalized modulated signals, and excludes from the combination process the equalized demodulated signal when a cross-correlation value and an autocorrelation value of the equalized demodulated signal rated against one of a maximum cross-correlation value, a cumulative cross-correlation value and an average cross-correlation value are below a predetermined threshold value.

7. The radio receiver as claimed in claim 4, wherein said combining means determines an autocorrelation value of each of the equalized modulated signals and excludes from the combination process the equalized demodulated signal when a cross-correlation value and an autocorrelation value of the equalized demodulated signal rated against one of a maximum cross-correlation value, a cumulative cross-correlation value and an average cross-correlation value is below a predetermined threshold value.

8. A radio receiver comprising:

a plurality of demodulating means for demodulating in parallel a received radio wave modulated using a pilot signal of a predetermined format and arriving via a respective one of a plurality of branches, so as to obtain a plurality of demodulated signals corresponding to the plurality of branches;

a plurality of channel characteristic estimation means for retrieving, from the plurality of demodulated signals obtained by the plurality of demodulating means, the pilot signal for individual paths formed by the plurality of branches, in accordance with the predetermined format, and for estimating a channel characteristic based on an error of a pilot signal point;

a plurality of equalizing means for applying an equalization process, adapted for the channel characteristic determined by said plurality of channel characteristic estimation means, on the plurality of demodulated signals obtained by said plurality of demodulating means, so as to obtain equalized demodulated signals corresponding to the plurality of branches; and combining means for executing a combination process of combining the equalized demodulated signals obtained by said plurality of equalizing means so as to produce a received signal, wherein said combining means excludes from the combination process the equalized demodulated signal when one of a first average value and a second average value rated against one of a maximum value of one of the first and second average values, a cumulative value of one of the first and second average values and an average value of one of the first and second average values is below a predetermined threshold value, the first average value being an average value of instantaneous values of the equalized demodulated signals, and the second average value being an average value of absolute values of the instantaneous values.

9. A radio receiver comprising:

a plurality of demodulating means for demodulating in parallel a received radio wave modulated using a pilot signal of a predetermined format and arriving via a respective one of a plurality of branches, so as to obtain a plurality of demodulated signals corresponding to the plurality of branches;

a plurality of channel characteristic estimation means for retrieving, from the plurality of demodulated signals obtained by the plurality of demodulating means, the pilot signal for individual paths formed by the plurality of branches, in accordance with the predetermined format, and for estimating a channel characteristic based on an error of a pilot signal point;

a plurality of equalizing means for applying an equalization process, adapted for the channel characteristic determined by said plurality of channel characteristic estimation means, on the plurality of demodulated signals obtained by said plurality of demodulating means, so as to obtain equalized demodulated signals corresponding to the plurality of branches; and combining means for executing a combination process of combining the equalized demodulated signals obtained by said plurality of equalizing means so as to produce a received signal, wherein said combining means cross-correlates the equalized modulated signals obtained by said plurality of equalizing means, determines an autocorrelation value of each of the equalized modulated signals, and excludes from the combination process the equalized demodulated signal when a cross-correlation value and an autocorrelation value of the equalized demodulated signal rated against one of a maximum cross-correlation value, a cumulative cross-correlation value and an average cross-correlation value are below a predetermined threshold value, and wherein said combining means determines a correlation value including an autocorrelation value for all combinations of the equalized demodulated signals and obtains a cross-correlation value by subtracting the autocorrelation value from the correlation value.

10. A radio receiver comprising:

a plurality of demodulating means for demodulating in parallel a received radio wave modulated using a pilot signal of a predetermined format and arriving via a respective one of a plurality of branches, so as to obtain a plurality of demodulated signals corresponding to the plurality of branches;

a plurality of channel characteristic estimation means for retrieving, from the plurality of demodulated signals obtained by the plurality of demodulating means, the pilot signal for individual paths formed by the plurality of branches, in accordance with the predetermined format, and for estimating a channel characteristic based on an error of a pilot signal point;

a plurality of equalizing means for applying an equalization process, adapted for the channel characteristic determined by said plurality of channel characteristic estimation means, on the plurality of demodulated signals obtained by said plurality of demodulating means, so as to obtain equalized demodulated signals corresponding to the plurality of branches;

combining means for executing a combination process of combining the equalized demodulated signals obtained by said plurality of equalizing means so as to produce a received signal;

signal pre-detection means for performing a signal detection on a sum of the equalized demodulated signals obtained by said plurality of equalizing means, so as to obtain a signal point indicated by the sum;

signal level calculating means for normalizing each of the equalized demodulated signals obtained by said plurality of equalizing means with respect to a signal point obtained by said signal pre-detection means, so as to obtain a level of a signal component; and interference level calculating means for calculating a difference between a level of each of the equalized demodulated signals and the level obtained by the signal level calculating means, so as to obtain a level of an interference component;

wherein said combining means performs the combination process by multiplying each of the equalized demodulated signals by a weight equal to a ratio between the level of the signal component determined by said signal level calculating means and the level of the interference determined by said interference level calculating means.

* * * * *